United States Patent [19]

McClintock

[11] Patent Number: 4,704,315

[45] Date of Patent: Nov. 3, 1987

[54] COMPOSITE PRESSURE SENSITIVE SEAL ADHESIVE CONSTRUCTION

[75] Inventor: Jack M. McClintock, Stow, Ohio

[73] Assignee: Morgan Adhesives Co., Stow, Ohio

[21] Appl. No.: 896,924

[22] Filed: Aug. 15, 1986

Related U.S. Application Data

[63] Continuation-in-part of Ser. No. 465,288, Feb. 9, 1983, Pat. No. 4,584,217, which is a continuation-in-part of Ser. No. 218,273, Dec. 19, 1980, Pat. No. 4,389,270, which is a continuation-in-part of Ser. No. 38,679, May 14, 1979, Pat. No. 4,264,388, which is a continuation-in-part of Ser. No. 837,828, Sep. 29, 1977, Pat. No. 4,157,410, and a continuation-in-part of Ser. No. 303,058, Sep. 17, 1981, abandoned.

[51] Int. Cl.$^4$ .................. B32B 7/04; F16L 59/14; B29D 23/00
[52] U.S. Cl. .................. 428/40; 156/218; 156/310; 427/208; 427/208.4; 428/36; 428/43; 428/198; 428/202; 428/343; 428/352; 428/354
[58] Field of Search .................. 428/40, 41, 42, 43, 428/198, 201, 202, 343, 352, 354; 427/208, 208.8; 156/187, 203, 218, 310

[56] References Cited

U.S. PATENT DOCUMENTS

| 2,292,024 | 8/1942 | Dreher | 428/317.3 |
| 2,294,347 | 8/1942 | Bauer et al. | 428/343 |
| 2,599,359 | 6/1952 | Banks et al. | 427/208 |
| 2,797,731 | 7/1957 | Carlson, Jr. | 428/36 |
| 3,166,186 | 1/1965 | Karn | 428/43 |
| 3,380,582 | 4/1968 | Moyer, Jr. et al. | 428/314.4 |
| 3,770,556 | 11/1973 | Evans et al. | 156/218 |
| 3,833,456 | 9/1974 | Reed et al. | 428/41 |
| 4,022,248 | 5/1977 | Hepner et al. | 156/310 |
| 4,389,270 | 6/1983 | McClintock | 428/40 |

FOREIGN PATENT DOCUMENTS 52-71757  6/1977  Japan .................. 428/36

Primary Examiner—William J. Van Balen
Attorney, Agent, or Firm—Oldham, Oldham & Weber Co.

[57] ABSTRACT

A seal splice or tape comprising a carrier having an adhesive construction on the opposite side thereof. The adhesive construction comprises an adhesive coating on the carrier layer with a release agent and liner thereover. The adhesive coat extending from end to end on one side and only part way inboard on the opposite side. In a preferred embodiment, the carrier is scored near the end having adhesive on both ends to permit both layers of the liner to be removed essentially simultaneously or otherwise.

19 Claims, 3 Drawing Figures

COMPOSITE PRESSURE SENSITIVE SEAL ADHESIVE CONSTRUCTION

CROSS REFERENCE

This application is a continuation-in-part of U.S. Ser. No. 465,288, filed Feb. 9, 1983, U.S. Pat. No. 4,584,217, which is a continuation-in-part of U.S. Ser. No. 218,273, filed Dec. 19, 1980, U.S. Pat. No. 4,389,270, which in turn is a U.S. national filing of US-PCT 80/00559, filed May 13, 1980; which in turn is a continuation-in-part of U.S. Ser. No. 038,679, filed May 14, 1979, U.S. Pat. No. 4,264,388; which in turn is a continuation-in-part of U.S. Ser. No. 837,828, filed Sept. 29, 1977, U.S. Pat. No. 4,157,410. This patent application is a continuation-in-part of U.S. Ser. No. 303,058, filed Sept. 17, 1981, abandoned.

TECHNICAL FIELD

This invention relates to a composite pressure sensitive adhesive construction having special utility in making tape applications such as covering the end of a pipe insulation joint to give an adhesive-to-adhesive seal.

BACKGROUND ART

Insulation for pipe with or without a jacket is well known and widely used. Where the sections of insulation join, there is found a joint. Generally, these joints are covered with a tape of appropriate length by wrapping the tape around the joint and adhering with staples, dry glue brushed or an adhesive.

Prior art cited by the United States Patent and Trademark Office in the above ancestral applications contains the art known to applicant and his attorneys.

DISCLOSURE OF INVENTION

It is an aspect of the present invention to provide an article construction having special utility wrapping joints formed by sections of insulation.

It is a preferred aspect of the present invention that the article having particular utility in making wrapped splices or joints have a score line near at least one end thereof and have a release with a pull tab to facilitate presenting a clean adhesive surface to give an adhesive-to-adhesive layer when wrapped around the insulation joint.

Another aspect of this invention relates to an article having an adhesive and a release liner along one side and an adhesive and release liner over a portion of the opposite side.

These and other objects of the present invention will become apparent from the following specification which describes in detail the embodiments without attempting to discuss all of the modifications in which the invention might be embodied.

Generally, in installation, several lengths of an article having a longitudinal slit therein and an adhesive construction thereon that comprises the article and the adhesive construction are used. The adhesive construction comprises a carrier layer, said carrier layer having preferably two separate areas of an adhesive located at the lateral portions thereof, one of said lateral adhesive portions adhered to said article adjacent to said split, said second lateral adhesive portion located adjacent to said remaining split portion of said article, said adhesive carrier layer preferably having a central portion free from said adhesive and a release liner, said release liner attached to said second lateral adhesive portion. Then, the joint formed by the installed articles are wrapped with a splice seal member or tape. Although the article is described as having adhesive located thereon, it should be appreciated that the adhesive can be applied in any manner such as bulk spraying, painting, rolling, etc., in manufacturing the article.

Generally, the adhesive construction on a jacket is wrapped around an article having a slit therein, i.e., an insulation pipe section. When you open the jacket by pulling on the release tab, you expose the adhesive on the face side of the jacket and the slit in the article so the article can be placed over the pipe. The side of adhesive construction pulled back has a release member thereon. The release member is removed to expose the adhesive beneath the release member, said adhesive can be forced down to bond to the adhesive on the face side of the jacket. Then, additional sections are applied to form joints. The joints between each section are wrapped with a sealing tape.

In general, the splice seal member of this invention can be characterized as a carrier member having a layer of adhesive covered with a release liner on one side and an adhesive layer on a portion of the other side beginning at one end of said carrier member with a release liner covering said adhesive portion. An adhesive-to-adhesive bond between each end of the seal member is a preferred feature which may be facilitated by use of a special adhesive construction and, in one special embodiment, use of a score line near one end.

BEST MODE FOR CARRYING OUT THE INVENTION

Figure 3:
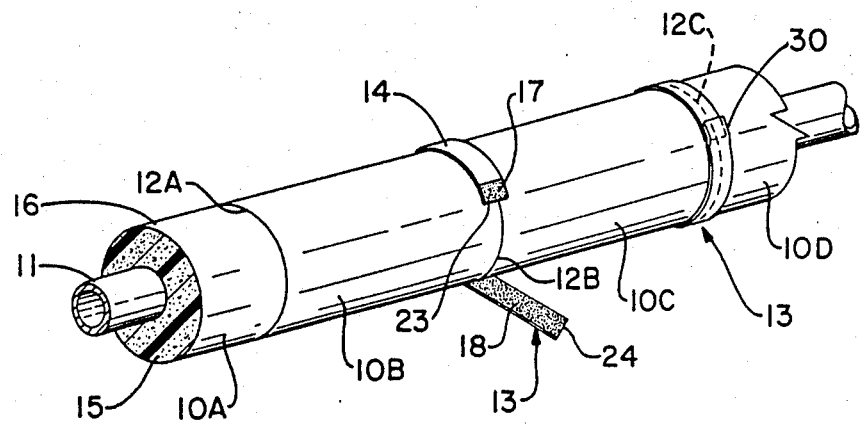
FIG. 3 is a perspective, partially broken away view of several sections or units of the pipe insulation jacket installed about a pipe in various stages of interconnection by employment of the sealant strip pressure sensitive adhesive construction.

Pipe insulation constructions such as that described and shown, for instance in the parent applications. The pipe insulation is taken to the job site to be installed. The release liner by its tab is removed so that the pressure sensitive adhesive layers may contact the adhesive on the surface of the insulation when the adhesive layers are brought into contact with the release liner removed, the adhesive layers can be brought into indexing relationship to complete the installation of the section of insulation around the pipe as shown in FIG. 3 by the four lengths of insulation designed in 10A, B, C and D.

At the site of installation of the sections 10 of insulation on pipe 11, the various sections identified herein as 10A, B, C and D may be sealed at the intersections or joints identified herein as 12A, B and C thereof, with the new seal member described in more detail hereinafter in regard to FIGS. 1 and 2. Referring again to FIG. 3, this sealing is accomplished by circumferential wrapping of sealant strip 13 at each intersection 12A, B and C. Without adequate protection of adjoining joints 10A, B and C, the insulative properties of the insulation portion 15 and the insulation barrier and vapor barrier functions of cover 16 are weakened at or adjacent to the unprotected intersections, for instance 12A.

Sealant strip or tape 13, when installed, adequately interconnects the intersections 12 of the sections 10 of insulation. Referring again to FIGS. 1 and 2, it is seen that strip 13 comprises a sealant or carrier layer 14 made usually from the same materials as cover 16 described above, two pressure sensitive adhesive layers 17 and 18, which are positioned on opposite sides of sealant layer 14, and the two exterior release liners 19 and 20, best seen in FIGS. 1 and 2, and which is releasably attached to respective adhesive layers 17 and 18 (best seen at intersection 12B) by the employment of release coatings 21 and 22 thereinbetween. The type and dimension of the adhesive layers 17 and 18 are further described by reference to the description of layers 17 and 18 in regard to FIGS. 1 and 2. Likewise, the materials used for liners 19 and 20 and release coatings 21 and 22 are adequately described by reference to the description of FIGS. 1 and 2. Since the liners, release coatings, and sealant layers 14 are generally in the form of a strip, they have two termini or ends 23 and 24 respectively, as seen in FIG. 3. Actually in the embodiment of FIG. 2, the end or termini 23 becomes end 28 of the strip 14 when the portion 29 is torn away.

From the drawings, it can be seen that adhesive layer 18 and release liner 20 with coating 22 extends over the entire lower side of layer 14. On the other hand, adhesive layer 17 and release liner 19, best seen in FIG. 1, with coating 21 extending over only a fractional portion of strip 14, the portion adjacent to its terminus or end 23, best seen in FIGS. 1 and 2. The adhesive layer 17, best seen in FIG. 3, is placed on carrier 14 only to the extent necessary to provide adequate surface contact area for adhesive-to-adhesive contact with adhesive layer 18 at the opposite terminus or end 24 of the same carrier 14 as seen in FIG. 3.

As seen in FIG. 3, three intersections 12A, B and C are illustrated in various stages of application of the splice seal: two sections of pipe insulation 10A and B are shown without sealant strip 13 at 12A, followed by a partial installation of strip 13 over the intersection 12B, followed by a completed installation of strip 13 over intersection 12C. Strip 13 is placed upon intersection 12 after the removal of external release liner 20, which may be performed individually or essentially simultaneously with peeling away of release liner 19. These steps minimize foreign materials from collecting and disrupting the adhesive qualities of layer 17 and 18. Where the release liners are removed individually rather than simultaneously, liner 20 is removed and terminus 23 is placed over the joint or intersection as best shown at 12B of FIG. 3 and as terminus 24 approaches terminus 23, then it is preferred to remove liner 19 to expose the adhesive portion 17 on the opposite side of the carrier. The two termini are brought into overlapped or indexed relation to give the completely installed joint splice shown at 12C. Adhesive layer 17 is provided on carrier layer 14 to improve the bonding qualities of the strip, to increase the shear strength thereof, to eliminate the use of other adhesives which require heating to complete the sealing requirements and/or use of stapling or other methods. The sealant strip 13 may be of any length greater than the circumference of pipe section 10 and preferably plus the surface area of adhesive layer 17 which may be adjusted according to degree of overlaps of the two adhesive areas desired. The technique of using pressure adhesive to give an adhesive-to-adhesive bond results in a stronger bond than if adhesive layer 18 was secured to the upper side of sealant layer 14 alone. The width of strip 13 may vary according to the strength of interconnection and sealing, but generally a width of 4 to 10.0 centimeters is adequate on usual pipe sections 10.

Figure 1:
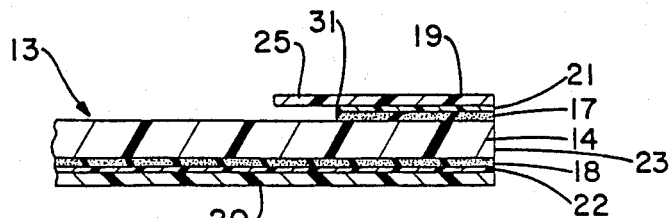
FIG. 1 is a partial sectional view through the strip member.
Figure 2:
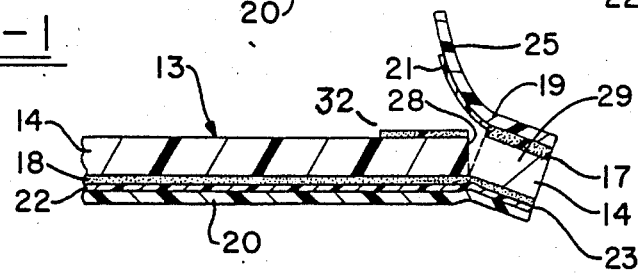
FIG. 2 is a special embodiment of FIG. 1 showing the tab pull breaking away a portion of the article along a score line.

For ease of removal, the release liner 19 may have a tab 25 overlap the adhesive layer 17 preferably extending inwardly along strip 13, as best seen in FIGS. 1 and 2. This location of the tab facilitates removal of liner 19 with one hand while the other hand is maintaining proper application of strip 13 near terminus 24.

Referring specifically to FIGS. 1 and 2, the construction of the tab release means is described in greater detail. The adhesive construction of strip or tape 13 is achieved generally according to the teachings of my copending application Ser. No. 465,288, filed Feb. 9, 1983, where the number 14 is a carrier layer such as the familiar ASJ type material, with a continuous adhesive layer 18 positioned as shown. Adhesive layer 18 extends from termini 23 to termini 24 to adhere to the sections 10 of insulation to seal the joints as shown in FIG. 3 by 12C. A release coat 22 is applied to release liner 20 and the release coat 22 on release liner 20 is placed over the adhesive layer 18 in the factory by usual means to protect the strip until it is ready to be used as shown in FIG. 3. In general, the pressure sensitive adhesive is applied in varying thicknesses ranging from about ½ mil to about 4 mils, with a desired thickness ranging from about 1 mil to about 3 mils, a preferred thickness is about 1.7 to 2.3 mils. Actually, the thickness depends on the surface of the material such as scrim, rough Kraft paper or smooth vinyls to be adhered. Thus, the adhesive thickness of layer 18 may be the same, more or less than that of layer 17, depending on the nature of the surface to which it is to be adhered. Of course, larger thicknesses can be used but tend to be uneconomical. Common or conventional pressure sensitive type adhesives well known to those skilled in the art and set forth in greater detail in my U.S. patent application Ser. No. 465,288, filed Feb. 9, 1983, may be utilized such as an adhesive containing an acrylate base or an elastomer base, which may be formulated regard to specific purposes and/or uses and, hence, may contain flame retardants, dyes, antioxidants, and the like. A specific example of a rubber-based pressure sensitive adhesive is a blend of styrene-butadiene rubber and polyisoprene, or other polymers such as polychloroprene or neoprene and copolymers of dienes and monoolefins and at least a suitable tackifier, preferably of the polyolefin or terpene type. It is desirable to use an A type adhesive for layer 17 and a B type adhesive for layer 18 with the provision that A and B can react to give an improved bond.

As indicated above, the adhesive construction of a continuous strip or roll of desired width, usually about 4 to 10 centimeters but in other cases 2 to 20 or more centimeters wide can be made as described and then be cut into the desired length for the size splice to be made. Then, splice strip 13 of the desired length may have one end thereof scored along line 28 to permit the liner 13 to be torn away as shown in FIG. 2, as a simultaneous operation rather than two separate individual operations.

To facilitate the tearing away of the scored end 29, a pull tab 25 is attached to or formed of the liner 19 as seen in FIGS. 1 and 2. First, a layer of adhesive 17 is spread on the top of strip 13 as shown. Usually the score line 28 is about 0.2 to 1.4 centimeters and preferably 0.5 to 1.0 centimeters from the end 23. The layer of adhesive 17 extends from end 23 past the score line 28 usually about 0.5 to 6 or more centimeters and preferably 1 to 4 centimeters. This extension 32 beyond the score line 28 essentially determines the overlap of end 23 by end 24 as the strip is brought to the position shown by numeral 30 of FIG. 3 to give an adhesive-to-adhesive bond zone.

Referring specifically to FIG. 1, it can be seen that the adhesive layer 17 extends all the way to the end 23 of the strip or carrier as well as does the release material 21. Thus, when the tab 25 is lifted, the liner 19 peels back to expose the adhesive layer 17 best seen in FIG. 3.

On the other hand in the embodiment of FIG. 2, the release material 21 stops before it reaches the end 23. In practice, the release material stops at about the score line 28 whereas the adhesive layer 17 extends past the score line 28 to the end 23. Thus, the release liner 21 when lifted in this embodiment by tab 25 peels back until it reaches score line 28, then it tears away a portion 29 of the carrier to effect or start the peeling away of release liner 20. Thus, it is possible by pulling on tab 25 to simultaneously peel away release liners 19 and 20 in this embodiment.

The liner 19 protects the layer of adhesive 17 until the liner is lifted and exposes the adhesive. For example, the workman holds composite strip 13 and lifts tab 25 to break through the composite along score line 28 to tear away the portion 29 of the adhesive construction as shown in FIG. 2 to expose the adhesive layer below. It should be noted that as portion 29 is torn away, it tears through layers 17 and 18 of the adhesive respectively which may be scored too, and then begins to strip liner 20 away to expose the layer 18 of the adhesive. This stripping of liner 20 continues until it fully reveals layer 18, as best seen in FIG. 3. This invention permits the liner to be pulled away as the strip is brought down in contact with the pipe. Thus, the chances for the layer of adhesive to be contaminated is minimized.

Although the strip has been described with a tab, the liner 19 could stop at the point designated at 31 and thus there would be no tab pull per se. In that case; the workman would have to peel liner 19 off without benefit of the tab as is done in the typical liner-adhesive assemblies.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A splice article including a carrier having an adhesive construction on its opposite sides, said adhesive construction including an adhesive coating on said opposite sides, on one side the coating extends essentially from end to end and on the other side extends from an end inboard a sufficient distance to give desired overlap on installation of said article, a release agent covering said adhesive coat on each side of the carrier, and a release liner on said release agent, said carrier having a score line near the end containing adhesive on its opposite sides and there is no release agent between that end and the score line on the side where adhesive does not extend from end to end.

2. The seal article of claim 1 wherein the adhesive coat is a pressure sensitive one.

3. A splice article including a carrier having an adhesive construction on its opposite sides, said adhesive construction including an adhesive coating on said opposite sides, on one side the coating extends essentially from end to end and on the other side extends from an end inboard a sufficient distance to give desired overlap on installation of said article, a release agent covering said adhesive coat on each side of the carrier, and a release liner on said release agent, said adhesive applied to one side being different from that applied to the opposite side.

4. The article of claim 3 wherein the different adhesives can react with each other to form an enhanced bond.

5. An article having a score line near at least a longitudinal end thereof to form a scored section and having an adhesive construction on each side thereof, the adhesive construction on one side comprising a layer of adhesive covered with a release agent and release liner and on the other side having an adhesive layer extending over the scored section inboard past the score line and having a release agent on said adhesive layer extending inboard from score line and a release liner covering said release agent and the scored section.

6. The article of claim 5 wherein the adhesive coat is a pressure sensitive one.

7. The article of claim 5 wherein the adhesive applied to one side is different from that applied to the other side.

8. The article of claim 7 wherein the different adhesives can react with each other to form an enhanced bond.

9. The article of claim 5 wherein the release liner extends past the release agent to form a pull tab.

10. A method of making a splice composition comprising without sequence (a) coating one side of a carrier with a coat of adhesive and applying over said coat a release agent and a release liner to protect said coat and (b) coating the opposite side of said carrier from one end inboard aways with an adhesive and applying over said adhesive on this side a release agent and a release liner, said liner extending beyond said release agent sufficient to provide a tab for removal of said liner.

11. The method of claim 10 wherein the splice composition is slit or cut into strips to form a splice strip.

12. The method of claim 10 wherein the adhesive applied to one side is different from that applied to the opposite side.

13. The method of claim 10 wherein the different adhesives effect an enhanced bond between overlapping ends.

14. The method of claim 10 wherein the carrier is scored at a slight distance from the end that adhesive extends only inboard aways and before said release liner is applied to each side having adhesive extending only inboard aways.

15. An adhesive member including a carrier having a layer of adhesive covered with a release liner on one side and an adhesive layer on a portion of the other side to permit the end of said member in installation to overlap and bring the layers of adhesive into overlapping contact said adhesive applied to one side being different from that applied to the other side.

16. The adhesive member of claim 15 wherein the adhesive applied to one side is different from that applied to the other side.

17. The adhesive member of claim 15 wherein the different adhesives or adhesive precursors can react with each other to form an enhanced bond.

18. The adhesive member of claim 15 wherein the carrier has a reflective face.

19. The adhesive member of claim 15 wherein the reflective face is aluminum.

* * * * *